A. F. SULZER.
ANTISTATIC PHOTOGRAPHIC FILM.
APPLICATION FILED APR. 25, 1921.
1,418,405.
Patented June 6, 1922.
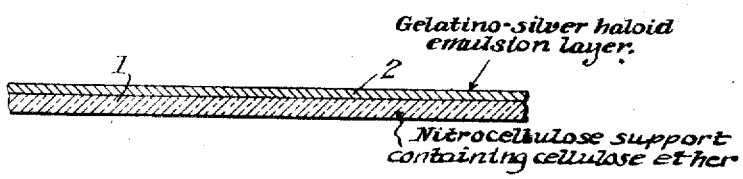
Gelatino-silver haloid emulsion layer.
Nitrocellulose support containing cellulose ether
WITNESS
INVENTOR
Albert F. Sulzer,
BY
ATTORNEY

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

ANTISTATIC PHOTOGRAPHIC FILM.

1,418,405.  Specification of Letters Patent.  Patented June 6, 1922.

Application filed April 25, 1921. Serial No. 464,310.

*To all whom it may concern:*

Be it known that I, ALBERT F. SULZER, a citizen of the United States of America, residing at Rochester, in the county of Monroe and State of New York, have invented certain new and useful Improvements in Antistatic Photographic Films, of which the following is a full, clear, and exact specification.

This invention relates to anti-static photographic film. The principal object of my invention is to provide a photographic film having an inexpensive nitrocellulose base possessing the usual qualities and at the same time the property of co-acting with the sensitized photographic layer, so as to prevent or greatly minimize "static", by which is meant markings due to electrical discharges. Other objects will hereinafter appear.

In the handling of sensitive photographic film, particularly that of the standard type which includes a nitrocellulose support or base, characteristic lines or patches sometimes appear on development, due to electrical discharges which are induced during such handling so as to fog the film. The prevention of this defect becomes very important in the motion picture field, particularly when making negative film strips.

Under certain conditions the movement of the film through the motion picture camera may cause it to be very injuriously affected unless certain precautions are taken. While the defect appears more strongly in some types of cameras than others, and while it may to a certain extent be avoided by alterations in the camera or troublesome attachments thereto, nevertheless, it is highly desirable to prevent static by a proper constitution of the film itself, so that the latter may be employed in any commercial apparatus without precautions being necessary.

The nitrocellulose base forms a relatively inexpensive support which at the same time possesses other useful qualities. It is, therefore, desirable that some way be found to retain these qualities in this cheap material and at the same time prevent it from co-acting with the light sensitive gelatino silver haloid layer to produce the static trouble. I have discovered that this can be accomplished by incorporating small amounts of cellulose ether with the nitrocellulose.

In the accompanying drawing, the single figure is a sectional view on an exaggerated scale of a film embodying my invention.

In the drawing 1 is the base or support and 2 the sensitive layer.

In carrying out one illustration of my invention I may add from 2 to 10 (preferably 5) parts of cellulose ether (say water-insoluble ethyl cellulose) to every 100 parts of nitrocellulose, the union being effected by dissolving them in a common solvent, such, for example, as a mixture of methyl alcohol 45%, ethyl acetate 20% and chloroform 35%. The amount of solvent that is employed relative to the weight of nitrocellulose and cellulose ether can be varied greatly, as will be understood by those skilled in the art, so as to vary the rate of flow of the solutions. A useful film-forming dope may be prepared, for instance, by dissolving 100 parts of nitrocellulose and 5 parts of cellulose ether in 500 parts of the mixed volatile solvent described above.

The dope containing the nitrocellulose and ether, when thoroughly mixed and filtered if desired, is flowed or deposited into thin sheets from which the volatile solvents evaporate, leaving a tough, flexible, transparent film base or support, which in all of its principal characteristics and in its relative cheapness is essentially like an ordinary nitrocellulose support. But when the usual sensitive photographic coatings are applied to such support, the latter co-operates with the coatings in such a way that static is prevented or very greatly minimized.

Having thus described my invention, what I claim as new and desire to secure by Letters Patent is:

1. An anti-static photographic film having a sensitive coating and a support therefor comprising sufficient nitrocellulose to produce, if alone, static markings in said coating, and sufficient cellulose ether to prevent said static markings being formed in said coating.

2. An anti-static photographic film comprising a sensitive coating and a nitrocellulose support therefor which contains cellulose ether in an amount equal to from 2 to 10% of the weight of the nitrocellulose.

3. An anti-static photographic film comprising a sensitive coating and nitrocellulose support therefor, which contains an amount of cellulose ether equal approximately to 5% of the weight of the nitrocellulose.

4. An anti-static photographic film comprising a gelatino silver haloid negative emulsion and a nitrocellulose support therefor containing an amount of water-insoluble ethyl cellulose equal to from 2 to 10% of the weight of said nitrocellulose.

Signed at Rochester, New York, this 18th day of April, 1921.

ALBERT F. SULZER.